(12) United States Patent
Nakagawa

(10) Patent No.: US 12,473,059 B2
(45) Date of Patent: Nov. 18, 2025

(54) SHIP MANEUVER SUPPORTING DEVICE AND SHIP MANEUVER SUPPORTING METHOD

(71) Applicant: Furuno Electric Co., Ltd., Nishinomiya (JP)

(72) Inventor: Kazuya Nakagawa, Amagasaki (JP)

(73) Assignee: FURUNO ELECTRIC CO., LTD, Nishinomiya (JP)

( * ) Notice: Subject to any disclaimer, the term of this patent is extended or adjusted under 35 U.S.C. 154(b) by 112 days.

(21) Appl. No.: 17/868,860

(22) Filed: Jul. 20, 2022

(65) Prior Publication Data

US 2022/0348297 A1 Nov. 3, 2022

Related U.S. Application Data

(63) Continuation-in-part of application No. PCT/JP2020/048156, filed on Dec. 23, 2020.

(30) Foreign Application Priority Data

Jan. 20, 2020 (JP) ................................. 2020-007183

(51) Int. Cl.
*B63B 79/40* (2020.01)
*B63B 49/00* (2006.01)
*G01C 21/20* (2006.01)

(52) U.S. Cl.
CPC .............. *B63B 79/40* (2020.01); *B63B 49/00* (2013.01); *G01C 21/20* (2013.01)

(58) Field of Classification Search
CPC ......... B63B 79/40; B63B 49/00; B63B 43/18; B63B 79/30; G01C 21/20; G01C 21/203;
(Continued)

(56) References Cited

U.S. PATENT DOCUMENTS 8,665,135 B2 * 3/2014 Dai ...................... G01S 13/582
342/41
2006/0290562 A1 * 12/2006 Ehresman ................ G08G 3/02
342/41
(Continued)

FOREIGN PATENT DOCUMENTS

CN 105184480 A 12/2015
CN 106504585 A 3/2017
(Continued)

OTHER PUBLICATIONS

Extended European Search Report issued Jan. 4, 2024, in corresponding European Patent Application No. 20915571.2, 9 pages.
(Continued)

*Primary Examiner* — Anne Marie Antonucci
*Assistant Examiner* — Luis G Del Valle
(74) *Attorney, Agent, or Firm* — XSENSUS LLP

(57) ABSTRACT

A ship maneuver supporting device capable of displaying a collision risk zone which matches navigation feel of a ship operator with reduced calculation load, is provided. The ship maneuver supporting device 1 includes processing circuitry. The processing circuitry calculates a collision risk value for determining whether a collision risk zone that is a zone where a possibility of a collision between a first ship and a second ship will occur in the future is high is to be displayed, based on a separating distance between the position of the second ship estimated at a plurality of future time points and the position of the first ship estimated corresponding thereto, in consideration of a physical size of at least one of the first ship and the second ship. Further, the processing circuitry generates display data for displaying the collision risk zone at the estimated position of the second ship, based on the determination using the collision risk value.

12 Claims, 6 Drawing Sheets

(58) Field of Classification Search
CPC ........ G05D 1/0206; G08G 3/02; G01S 13/66; G01S 7/12; G01S 13/937
See application file for complete search history.

(56) References Cited

U.S. PATENT DOCUMENTS

| | | | | |
|---|---|---|---|---|
| 2010/0153013 | A1* | 6/2010 | Kondo | B63B 49/00 701/301 |
| 2016/0125739 | A1 | 5/2016 | Stewart et al. | |
| 2017/0052029 | A1* | 2/2017 | Ninomiya | G01C 21/203 |
| 2017/0067984 | A1* | 3/2017 | Nakahama | G01S 7/24 |
| 2019/0137624 | A1 | 5/2019 | Goto et al. | |
| 2019/0251849 | A1 | 8/2019 | Jeong et al. | |
| 2020/0035106 | A1* | 1/2020 | Suzuki | G08G 3/02 |
| 2020/0410869 | A1* | 12/2020 | Hakoyama | G01C 21/22 |

FOREIGN PATENT DOCUMENTS

| | | |
|---|---|---|
| CN | 108711312 A | 10/2018 |
| CN | 109154653 A | 1/2019 |
| CN | 110164184 A | 8/2019 |
| EP | 1760636 A2 | 3/2007 |
| JP | 62-117100 A | 5/1987 |
| JP | H08-235500 A | 9/1996 |
| JP | H11-125675 A | 5/1999 |
| JP | 2005-061893 A | 3/2005 |
| JP | 2005-289264 A | 10/2005 |
| JP | 2011-060179 A | 3/2011 |
| JP | 2013-028296 A | 2/2013 |
| JP | 2018-528508 A | 9/2018 |
| JP | 2019-204396 A | 11/2019 |
| WO | 1998016319 A1 | 4/1998 |
| WO | 2020008776 A1 | 1/2020 |

OTHER PUBLICATIONS

Hayama Imazu et al., "Obstacle Zone by Target and its Expression", Japan Institute of Navigation, May 16, 2002, including English-language abstract, 7 pp.
International Search Report mailed Mar. 2, 2021, 2 pp.
Office Action mailed Dec. 31, 2024, in Chinese Application No. 202080090828.4, 22 pages including English translation.
Notice of Allowance issued on Sep. 18, 2025, in corresponding Chinese patent Application No. 202080090828.4, 8 pages.

* cited by examiner

EXAMPLE OF
SCREEN DISPLAY

EMBODIMENT (a)

CONVENTIONAL TECHNOLOGY (b)

SHIP MANEUVER SUPPORTING DEVICE AND SHIP MANEUVER SUPPORTING METHOD

CROSS-REFERENCE TO RELATED APPLICATIONS

This application is a bypass continuation-in-part of PCT International Application No. PCT/JP2020/048156, filed Dec. 23, 2020, which claims priority to Japanese patent Application No. 2020-007183 filed Jan. 20, 2020, the entire disclosures of each of which are herein incorporated by reference for all purposes.

TECHNICAL FIELD

The present disclosure relates to a ship maneuver supporting device and a ship maneuver method.

BACKGROUND ART

Conventionally, ship maneuver supporting devices are known, which can calculate a zone where a collision of one ship with another will occur in the future, utilizing navigational information on the ships. Nonpatent Document 1 discloses a calculation technique of the zone by this kind of ship maneuver supporting device.

Nonpatent Document 1 discloses a technique for calculating an OZT (Obstacle Zone by Target) which is a space among a maneuvering space of a ship concerned, impeded by the existence of another ship and its movement. The calculation technique of the OZT according to Nonpatent Document 1 is as follows. That is, it defines an ETA (Estimated Time of Arrival) probability distribution which indicates the probability of a time point at which the ships reach an arbitrary point, in consideration of speed errors which occur on the ships, to calculate a probability of simultaneous existence of the ships at the arbitrary point. A location where this simultaneous existence probability is higher than a given probability value is considered to be the OZT where the possibility of a collision exists.

Reference Document(s) of Conventional Art

Nonpatent Document

[Nonpatent Document 1] Hayama IMAZU, Junji FUKUTO, and Masayoshi NUMANO: "Obstacle Zone by Target and its Expression," The Journal of Japan Institute of Navigation, vol. 107, pp. 191-197, September 2002.

DESCRIPTION OF THE DISCLOSURE

Problems to be Solved by the Disclosure

However, the technique of Nonpatent Document 1 described above calculates the OZT while considering the ships as points, and therefore, it does not take into consideration the actual sizes of the ships. Thus, even if a ship operator steers a ship to avoid the OZT in the indication, a near miss or a collision between the ship and another ship may still occur because the ships actually have the physical sizes.

Further, the technique of obtaining the OZT by calculating the simultaneous existence probability of the ships like Nonpatent Document 1 significantly increases the computational complexity. Therefore, according to the technique of Nonpatent Document 1, it is difficult from the viewpoint of a calculation load to increase the OZT calculating points, and thereby, it becomes difficult to improve the spatial resolution of the OZT indication.

The present disclosure is made in view of the above situations, and one purpose thereof is to provide a ship maneuver supporting device, capable of generating display data indicative of the risk of a collision with sufficient accuracy, and capable of reducing a calculation load in generating the display data.

Means for Solving the Problems and Effects

The problems to be solved by the present disclosure are as described above, and means for solving these problems and effects thereof will be described next.

According to one aspect of the present disclosure, a ship maneuver supporting device having the following configuration is provided. That is, the ship maneuver supporting device includes an other ship data acquiring module, an other ship future position estimating module, a ship data acquiring module, a ship future position estimating module, a risk calculating module, and a display data generating module. The other ship data acquiring module acquires information on a position and a velocity of a second ship. The other ship future position estimating module estimates, based on the position and the velocity of the second ship acquired by the other ship data acquiring module, positions of the second ship at a plurality of future time points when the second ship continues traveling on the same course at the same traveling speed. The ship data acquiring module acquires information on a position and a velocity of a first ship. The ship future position estimating module estimates, based on the position and the velocity of the first ship acquired by the ship data acquiring module, positions of the first ship corresponding to the positions of the second ship estimated by the other ship future position estimating module when the first ship continues traveling on a course arbitrarily defined at the position of the first ship, at the same traveling speed. The risk calculating module calculates a collision risk value for determining whether a collision risk zone that is a zone where a possibility of a collision between the first ship and the second ship will occur in the future is high is to be displayed, based on a separating distance between the position of the second ship estimated at each of the time points and the position of the first ship estimated corresponding thereto. The display data generating module generates display data for displaying the collision risk zone at the estimated position of the second ship, based on the determination using the collision risk value.

Accordingly, the display data for displaying the zone where a collision between the first ship and the second ship will occur in the future can be generated by using the separating distance between the first ship and the second ship. Therefore, a zone with higher adequacy which matches with the actual navigation feel of a ship operator can be displayed. Further, the collision risk value can be calculated based on the separating distance between the first ship and the second ship, instead of calculating a probability of simultaneous existence of the first ship and the second ship in consideration of the generation of the speed error. Therefore, the calculation load can be reduced.

In the ship maneuver supporting device, the separating distance is preferably calculated as a distance between the position of the second ship estimated at each of the time points and the position of the first ship estimated corresponding thereto.

Accordingly, the collision risk can be evaluated in a rational manner.

In the ship maneuver supporting device, the risk calculating module preferably calculates the collision risk value in consideration of a physical size of at least one of the first ship and the second ship.

Accordingly, the adequacy of the indication of the zone can be further increased.

In the ship maneuver supporting device, the following configuration is preferable. The risk calculating module is capable of calculating a watch risk value for determining whether a watch zone that is a zone where a possibility that the second ship will enter into a watch area in the future is high is to be displayed, based on the separating distance, in consideration of a physical size of the first ship, and a size of the watch area that is set forward and/or rearward of the first ship. The display data generating module is capable of generating display data for displaying the watch zone at the estimated position of the second ship so that the watch zone is distinguishable from the collision risk zone, based on the determination using the watch risk value.

Accordingly, when the ship operator etc. sets the watch area forward and/or rearward of the first ship as the area into which the second ship is not desirable to enter, it is possible to display the watch zone where the possibility that the second ship will enter into the watch area in the future is high, together with the collision risk zone. Thus, it is possible to support the ship operator more suitably. Further, since the watch zone and the collision risk zone are displayed distinguishably, it will help easy understandings of the ship operator.

In the ship maneuver supporting device, the display data generating module preferably generates the display data for displaying the watch zone, when the watch risk value is above a given threshold.

Accordingly, the watch zone can be displayed for a part where the possibility that the second ship will enter the watch area in the future is above the given degree.

In the ship maneuver supporting device, the collision risk zone and the watch zone displayed based on the display data are preferably different from each other at least in color.

Accordingly, the ship operator can easily distinguish and grasp the watch zone and the collision risk zone which are displayed in different colors.

In the ship maneuver supporting device, the size of the watch area preferably varies according to a traveling speed of the first ship.

Accordingly, the watch zone which matches with the feel of the ship operator which varies depending on the traveling speed can be displayed.

MODES FOR CARRYING OUT THE DISCLOSURE

Figure 1:
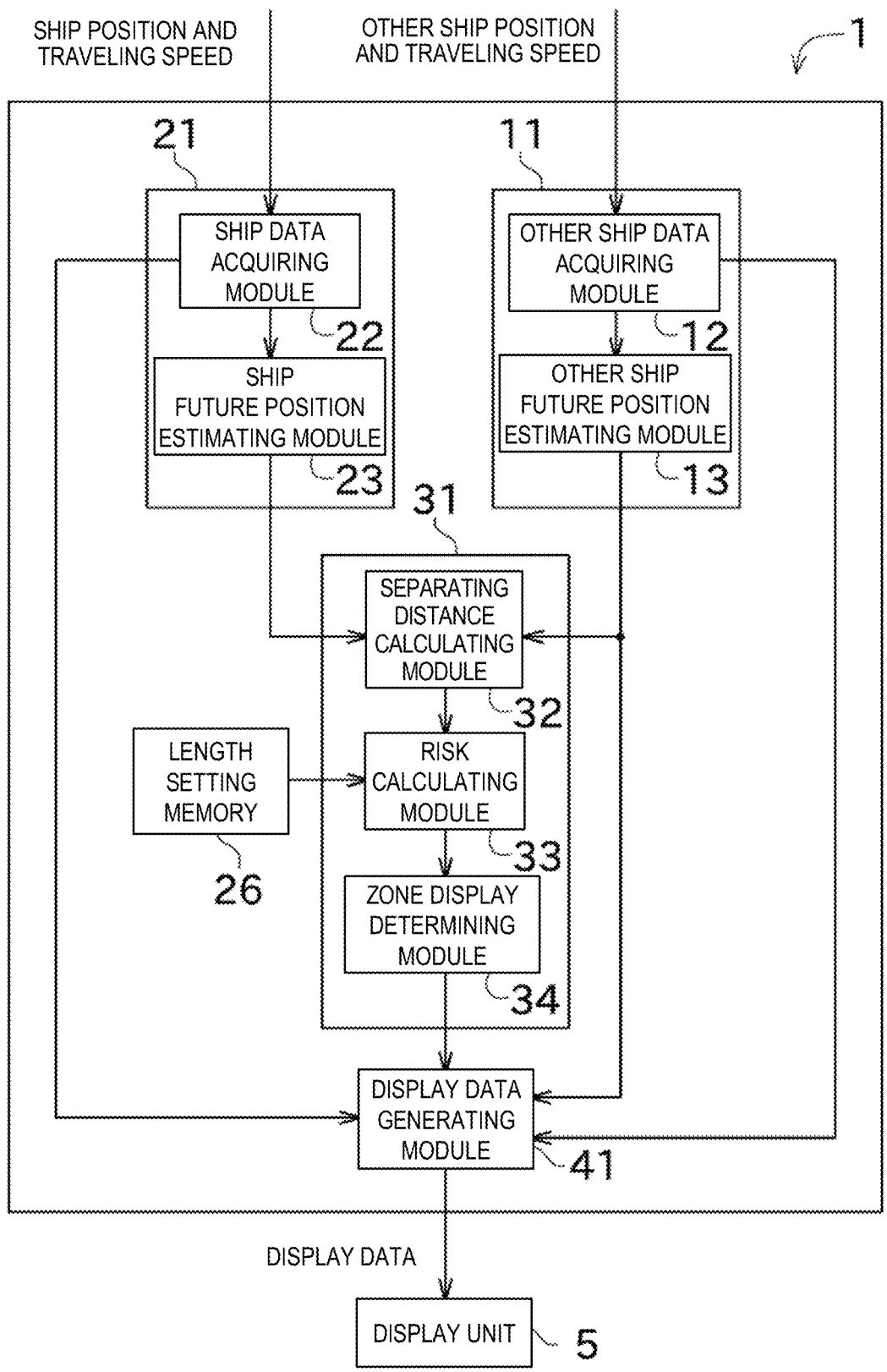
FIG. 1 is a block diagram illustrating an electric configuration of a ship maneuver supporting device according to a first embodiment.

Next, embodiments of the present disclosure are described with reference to the drawings. FIG. 1 is a block diagram illustrating an electric configuration of a ship maneuver supporting device 1.

First, a first embodiment is described. The ship maneuver supporting device 1 of the first embodiment illustrated in FIG. 1 may be provided to a ship (hereinafter, referred to as "the ship" or "this ship") which travels on a water surface.

The ship maneuver supporting device 1 may be connected to a display unit 5. The display unit 5 may be constituted, for example, as a liquid crystal display, and display information for supporting ship navigation. The ship maneuver supporting device 1 may generate display data for displaying a collision risk zone and a watch zone on the display unit 5, and output it to the display unit 5.

The collision risk zone may be a zone where the possibility of a collision between this ship and another ship will occur in the future is high. The watch zone may be a zone where, although the possibility of the collision is low, the possibility of another ship entering into a private area, which is set based on a relationship with this ship, in the future is high. These zones may be to indicate, in response to a course change in the ship, an area (OZT) where the ship is to be impeded by another ship on a scheduled course of another ship, and may be calculated by a different method from Nonpatent Document 1. The details of the collision risk zone and the watch zone will be described later.

The ship maneuver supporting device 1 may include an other ship data processing module 11, a ship data processing module 21, a length setting memory 26, a calculation processing module 31, and a display data generating module 41. Here, the other ship data processing module 11, the ship data processing module 21, the calculation processing module 31 and the display data generating module 41 may be included in processing circuitry (not showing in figures).

In detail, the ship maneuver supporting device 1 may be constituted as a known computer, and may be comprised of a CPU, a ROM, and a RAM. The ROM may store a program for generating the display data of the collision risk zone and the watch zone which are described above. By collaboration of the hardware and software described above, the ship maneuver supporting device 1 can be operated as the other ship data processing module 11, the ship data processing module 21, the length setting memory 26, the calculation processing module 31, the display data generating module 41, etc.

The other ship data processing module 11 may acquire data necessary for the indication of the collision risk zones and the watch zones related to other ships which exist around the ship. The other ship data processing module 11 may include an other ship data acquiring module 12 and an other ship future position estimating module 13.

Figure 2:
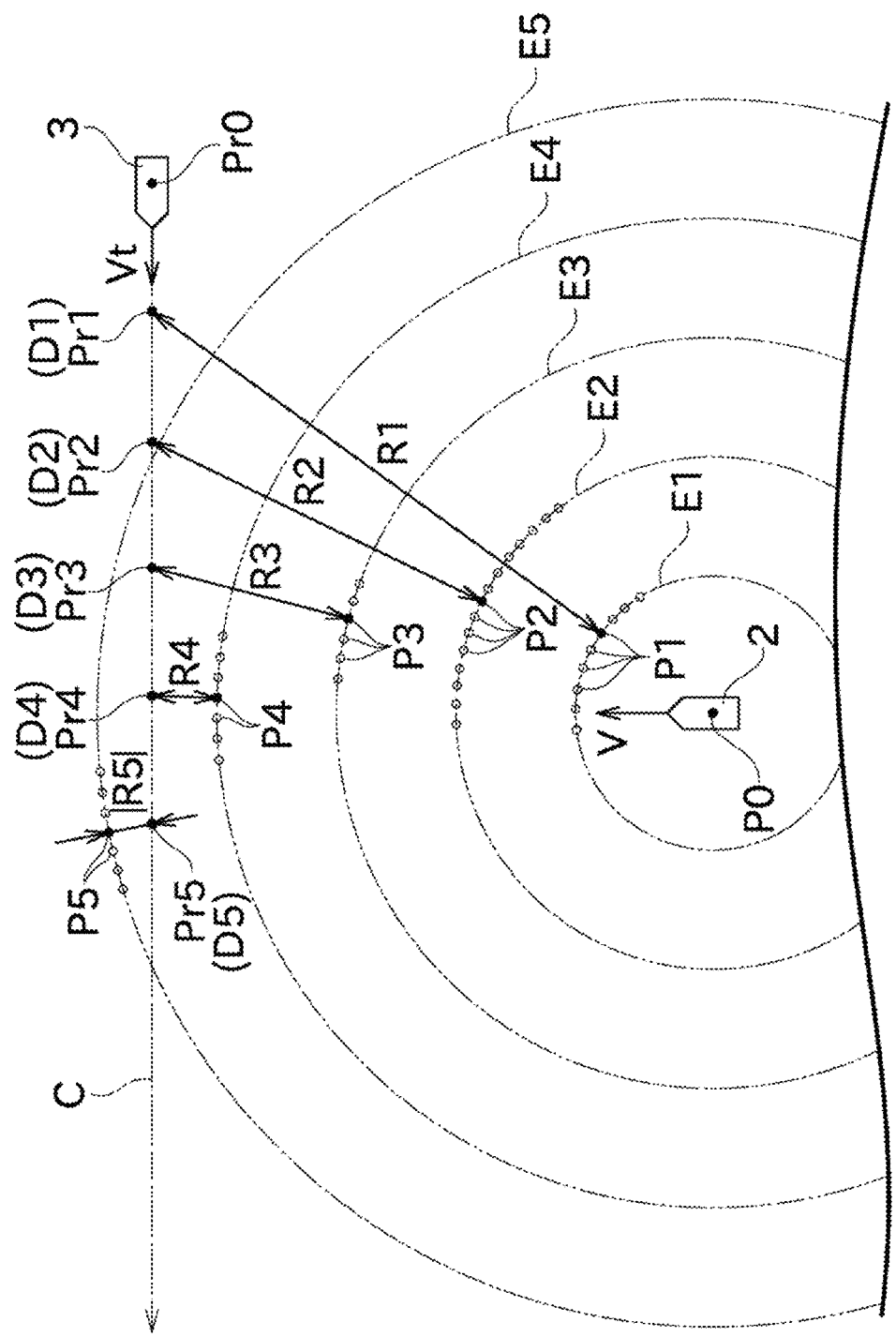
FIG. 2 is a view illustrating one example of a calculation of a separating distance.

As illustrated in FIG. 2 by a relationship between a ship 2 (the ship) and another ship 3, the other ship data acquiring module 12 may acquire an other ship position Pr0 which is the current position of the another ship 3, and an other ship velocity vector Vt which is a ship velocity vector of the another ship 3.

In detail, the ship maneuver supporting device 1 of FIG. 1 may be connected to a radar device (not illustrated) which detects the periphery of the ship 2 and generate a radar image. This radar device may have a TT (Target Tracking) function which is a technique for detecting and tracking the motion of a detected target object (another ship 3). Describing briefly since the TT function is known, the TT function acquires the position and the velocity vector of the target object (another ship 3) which exists around the ship by a calculation based on a transition of the past radar images.

The radar device may output, as the position and the velocity of the another ship 3, a position of a representative point and a velocity. As the position of the representative point, a position of the center of an echo image of the another ship 3 which appears in the radar image may be used, for example.

Although the radar device acquires the relative position and velocity of the another ship 3 on the basis of the ship 2, the position and the velocity vector of the another ship 3 which are inputted into the other ship data acquiring module 12 may be converted beforehand into ground-based values, based on the position and the heading of the ship 2 which are obtained by a suitable measure (for example, a known GNSS positioning device and a known direction sensor). The other ship data acquiring module 12 may output the acquired other ship position Pr0 and the other ship velocity vector Vt to the other ship future position estimating module 13, for every detected target object.

The other ship future position estimating module 13 may estimate a future position of the another ship 3. The obtained estimated position of the another ship 3 may serve as a positional reference for determining whether the collision risk zone and the watch zone are to be displayed on this position. In the following description, this position may be referred to as a "determination point."

Below, it is described in detail. As illustrated in FIG. 2, the other ship future position estimating module 13 may determine a plurality of future time points T1, T2, . . . at a suitable time interval ΔT from a reference time point T0 (in detail, the current time) which is a time point when the position and the velocity of the another ship 3 are obtained, as a starting point. Then, the other ship future position estimating module 13 may estimate other ship positions Pr1, Pr2, . . . at the future time points T1, T2, . . . described above, based on the position and the traveling speed of the another ship 3 (other ship position Pr0 and other ship velocity vector Vt) at the reference time point T0. The other ship positions Pr1, Pr2, . . . calculated by the estimation may become determination points D1, D2, . . .

When calculating the other ship positions Pr1, Pr2, . . . (determination points D1, D2, . . . ), the other ship future position estimating module 13 may assume that the another ship 3 moves from the other ship position Pr0, while maintaining the magnitude and the direction of the other ship velocity vector Vt which are acquired at the reference time point T0. That is, it may be considered that the another ship 3 continues traveling at the same course and the same traveling speed as those at the reference time point T0. Therefore, the other ship positions Pr1, Pr2, . . . can be calculated easily.

As illustrated in FIG. 2, the other ship positions Pr1, Pr2, . . . may be defined, at a suitable interval, so as to be lined up on a straight-line course C which is a line extending the other ship velocity vector Vt from the other ship position Pr0. Although in the example of FIG. 2 the other ship positions Pr1, Pr2, . . . are lined up at an equal interval, it is one example and the details will be described later. The other ship future position estimating module 13 may output data indicative of the acquired positions of the other ship positions Pr1, Pr2, (determination points D1, D2, . . . ) to the calculation processing module 31 and the display data generating module 41.

The ship data processing module 21 may acquire, regarding the ship 2, data necessary for the indication of the collision risk zone and the watch zone. The ship data processing module 21 may include a ship data acquiring module 22 and a ship future position estimating module 23.

The ship data acquiring module 22 may accept inputs of data related to a ship position P0 which is the position of the ship, and a ship velocity vector V.

The ship position P0 may be the current position of the ship 2. The ship maneuver supporting device 1 may be connected to a GNSS positioning device (not illustrated), and the ship data acquiring module 22 may be capable of acquiring the ship position P0 which is the position of the ship 2 based on the positioning result inputted from the GNSS positioning device.

The ship velocity vector V may be the current traveling speed of the ship 2. The ship data acquiring module 22 may be capable of acquiring the ship velocity vector V which is a traveling speed of the ship 2 by calculating a change in the position obtained from the GNSS positioning device.

The ship position P0 and the ship velocity vector V may mean the representative point of the ship 2 (in detail, a position of a location to which the GNSS antenna (not illustrated) is attached), and the velocity. The ship data acquiring module 22 may output the acquired ship position P0 and ship velocity vector V, to the ship future position estimating module 23.

The ship future position estimating module 23 may estimate future positions of the ship at the plurality of time points T1, T2, . . . which are described for the other ship future position estimating module 13. The estimated ship positions P1, P2, . . . may correspond to the other ship positions Pr1, Pr2, estimated by the other ship future position estimating module 13 at the time points T1, T2, . . . , respectively.

When calculating the ship positions P1, P2, . . . , the ship future position estimating module 23 may assume that the magnitude of the ship velocity vector V acquired at the reference time point T0 is constant, but the direction of the ship velocity vector V changed to an arbitrary direction at the reference time point T0, and, after that, the ship 2 continues traveling from the ship position P0 in the fixed direction. That is, it may be considered that the ship 2 defines the course arbitrarily at the ship position P0, but, after that, it continues traveling on the course at the same traveling speed. Therefore, the estimated ship positions P1, P2, . . . may all be located on concentric circles centering on the ship position P0 at the reference time point T0.

In FIG. 2, as for the ship positions P1, P2, . . . , some of the many estimated positions are illustrated by small circles. The radii of the circles where the estimated ship positions P1, P2, . . . are disposed (hereinafter, may also be referred to as "ship position candidate circles E1, E2, . . . ") may be equal to a product of times from the reference time point T0 to the respective time points T1, T2, . . . and the magnitude of the ship velocity vector V.

Thus, the ship future position estimating module 23 of FIG. 1 may calculate the ship position candidate circles E1, E2, . . . at the time points T1, T2, . . . , respectively. The ship future position estimating module 23 may output data related to the ship position candidate circles E1, E2, . . . to the calculation processing module 31 as the estimated ship positions P1, P2, . . . , respectively.

The length setting memory 26 may store a ship length L and a private length PL.

Figure 3:
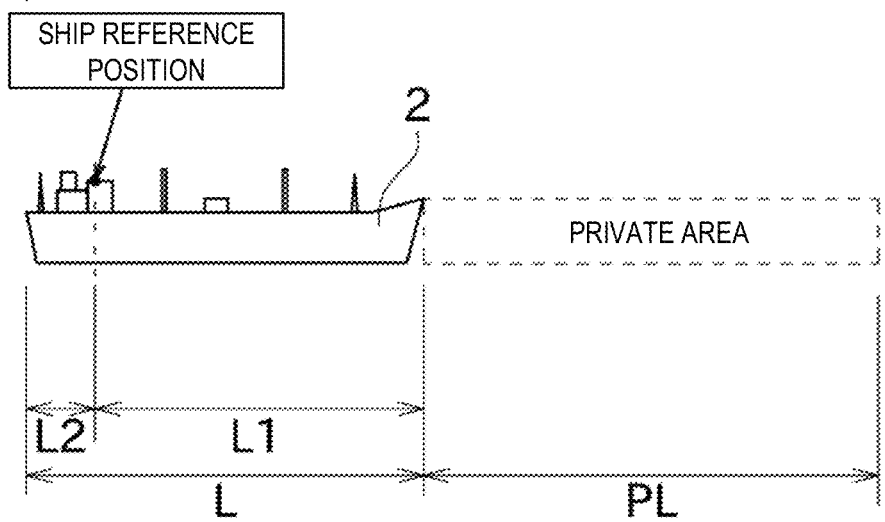
FIG. 3 is a view illustrating one example of a risk function for converting the separating distance into a risk value.
Figure 3:
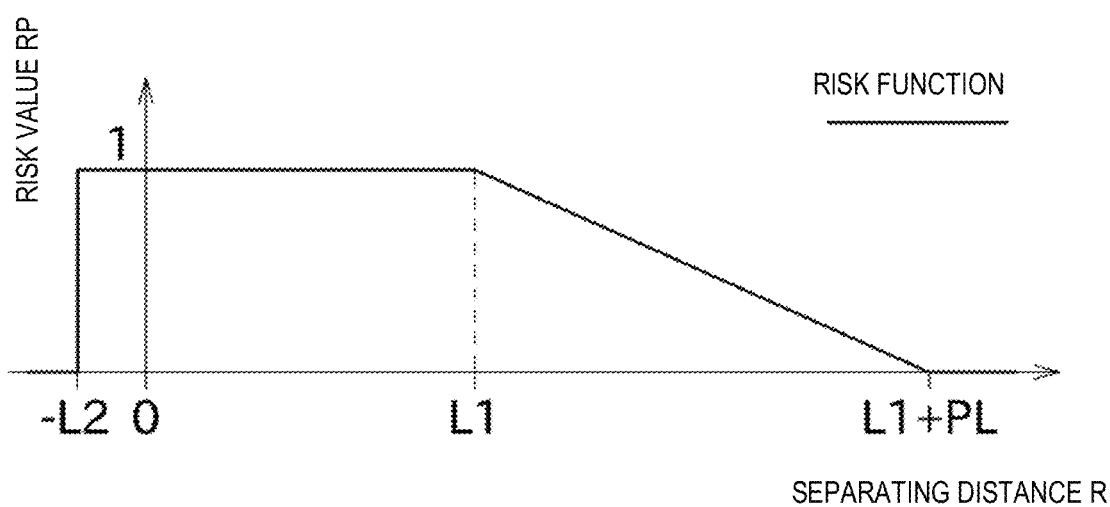

As illustrated in FIG. 3(a), the ship length L may be a full length of the ship 2 in the front-and-rear direction. The ship length L may indicate a physical size of the ship 2 in the front-and-rear direction. In this embodiment, if another ship 3 exists within a range of the ship length L, it is considered that a collision will occur between the ship 2 and the another ship 3. Note that the ship position P0 which is acquired by the ship data acquiring module 22, and the ship positions P1, P2, . . . estimated by the ship future position estimating module 23 may mean an attaching position of the GNSS antenna described above to the ship body, and this position (the representative point described above, and hereinafter, it is referred to as "the ship reference position") may be normally located at an intermediate part of the ship length L. Therefore, the parameter of the ship length L may be a combination of a length L1 from the ship reference position to the bow and a length L2 from the ship reference position to the stern. The two lengths L1 and L2 may be suitably set to the ship maneuver supporting device 1 in advance.

The private length PL may mean the length of the private area (watch area) in the front-and-rear direction, where the physical contact between the ship 2 and the another ship 3 does not occur because the private length PL is not included in the ship length L, but the ship operator feels that the entry of the another ship 3 into the private area is mentally unpreferred. The private area can be taken as a personal area where, when considering a distance from one person to another, the person becomes cautious if another person approaches the person from front or rear. The private length PL may be set, by the ship operator, as an arbitrary length at least on the front side or the rear side of the ship length L. For example, the ship operator can set the private length PL of 0.5 NM (nautical mile) long on the front side of the ship length L.

The length setting memory 26 illustrated in FIG. 1 may output the stored ship length L and private length PL to the calculation processing module 31.

Next, the calculation processing module 31 is described. The calculation processing module 31 may determine by a calculation whether the collision risk zone or the watch zone is to be displayed at each of the determination points D1, D2, . . . as described above using the data outputted from the other ship data processing module 11 and the ship data processing module 21.

The calculation processing module 31 may include a separating distance calculating module 32, a risk calculating module 33, and a zone display determining module 34.

The separating distance calculating module 32 may calculate separating distances R1, R2, . . . which are distances between the other ship positions Pr1, Pr2, . . . where an arrival is estimated for the respective future time points T1, T2, . . . , and corresponding ship positions P1, P2, . . .

Since the separating distances R1, R2, . . . are for evaluating the risk of a collision, it is rational to consider a case where the ship 2 and another ship 3 approach each other the most, among various anticipated cases. Thus, for example, upon a calculation of the separating distance R1 at the time point T1, the separating distance calculating module 32 may select a position which is the closest to the other ship position Pr1 at the time point T1, from the large number of ship positions P1 estimated for the time point T1.

In FIG. 2, the ship position P1 selected for the calculation of the separating distance R1 from the large number of estimated ship positions P1 is illustrated by a black circle. The separating distance R1 may be calculated as a distance between the black-circle position among the ship positions P1, and the other ship position Pr1.

When taking the time point T1 as one example, the separating distance R1 may mean the minimum distance between the point on the ship position candidate circle E1, and the other ship position Pr1. The separating distance R1 at the time point T1 can be calculated easily by calculating a distance between the other ship position Pr1 at the time point T1 and the ship position P0 at the reference time point T0 (the center of the ship position candidate circle E1), and subtracting the radius of the ship position candidate circle E1 from this distance. The separating distances R2, . . . at other time points T2, . . . are similar.

Thus, the separating distance calculating module 32 may calculate a separating distance Rn which is a distance between the future position of the ship 2 and the future position of the another ship 3 which are estimated, while considering that the traveling speeds of the ship 2 and the another ship 3 are fixed. Therefore, the separating distance Rn can be acquired by the simple geometric calculation.

Since the separating distance Rn can be calculated by the calculation method described above, the value may become not only positive but negative. If the separating distance Rn is positive, it may mean that the ship position Pn is closer to the ship position P0 at the reference time point T0 than the other ship position Prn. If the separating distance Rn is negative, it may mean that the ship position Pn is farther from the ship position P0 at the reference time point T0 than the other ship position Prn. In the example of FIG. 2, the separating distances R1, R2, R3, and R4 become positive, and the separating distance R5 becomes negative.

If the separating distance Rn is positive, it may indicate that the another ship 3 is located on the bow side of the ship 2 in the case where the ship 2 and the another ship 3 approach each other the most. If the separating distance Rn is negative, it may mean that the another ship 3 is located on the stern side of the ship 2 in the case where the ship 2 and the another ship 3 approach each other the most.

In this embodiment, in the stage where the separating distance calculating module 32 calculates the separating distance Rn, the ship 2 and the another ship 3 each may be treated as a point, and therefore, their physical sizes may not be taken into the consideration. The separating distance Rn may be expressed as a distance between the ship reference position which is the representative point of the ship 2, and the representative point of the another ship 3.

The risk calculating module 33 of FIG. 1 may calculate risk values (a collision risk value, a watch risk value) RPn which are parameters for determining whether the collision risk zone and the watch zone are to be displayed. In detail, the risk calculating module 33 may convert the separating distances Rn calculated by the separating distance calculating module 32 into the risk values RPn, by utilizing a risk function FR defined beforehand. The risk value RPn may be a value of 0 or larger and 1 or smaller, where "0" indicates that there is no possibility of a collision between the ship 2 and the another ship 3, and "1" indicates that the ship 2 and another ship 3 will collide.

The risk function FR which the risk calculating module 33 uses for the calculation may be defined with reference to the stored contents of the length setting memory 26. In FIG. 3(b), the risk function FR used in this embodiment is illustrated by a graph in which the ship reference position of FIG. 3(a) is the origin, the separating distance R is on the horizontal axis, and the risk value RP is on the vertical axis.

As illustrated in FIG. 3(b), when the separating distance R is within a range corresponding to the ship length L (a range of $-L2 \leq R \leq L1$), the value of the risk function FR becomes 1. Further, when the separating distance R is within a range corresponding to the private length PL ($L1<R<L1+PL$), the value of the risk function FR becomes a value larger than 0 and smaller than 1, and the value decreases monotonously as the separating distance R increases. When the separating distance R is within a range which does not correspond to either the ship length L or the private length PL ($R<-L2$, or $R \geq L1+PL$), the value of the risk function FR becomes 0.

Thus, in this embodiment, the risk calculating module 33 may calculate the risk value RP using the risk function FR of which the value becomes 1 within the range where the separating distance R corresponds to the ship length L. Therefore, the possibility of a collision can be evaluated in consideration of the physical length of the ship.

The risk calculating module 33 may output to the zone display determining module 34 risk values RP1, RP2, . . . which are acquired by substituting the separating distances R1, R2, . . . in the risk function FR.

The zone display determining module 34 may determine whether, at each of the determination points D1, D2, . . . , the collision risk zone is to be displayed, the watch zone is to be displayed, or none of them is to be displayed, according to the risk values RP1, RP2, . . . outputted from the risk calculating module 33.

In detail, if the risk value RPn outputted from the risk calculating module 33 is 1, the zone display determining module 34 may determine that the collision risk zone is necessary to be displayed. If the risk value RP outputted from the risk value RP is smaller than 1 but larger than 0, the zone display determining module 34 may determine that the watch zone is necessary to be displayed. If the risk value RP is 0, the zone display determining module 34 may determine that neither the collision risk zone nor the watch zone is necessary to be displayed.

Thus, according to the calculation processing module 31 of this embodiment, the probability distribution may be calculated not considering the velocity error which is used conventionally for the OZT. That is, the calculation processing module 31 may consider that there is no error between the ship velocity vector V and the other ship velocity vector Vt, and simply determine whether the collision risk zone and the watch zone are to be displayed based on whether the positional relationship between the reference position of the ship 2 and the representative point of the another ship 3 which is expressed by the separating distance Rn falls within the range of the ship length L, or falls within the range of the private length PL. Therefore, the computational complexity required for the determination can be reduced remarkably.

Figure 4:
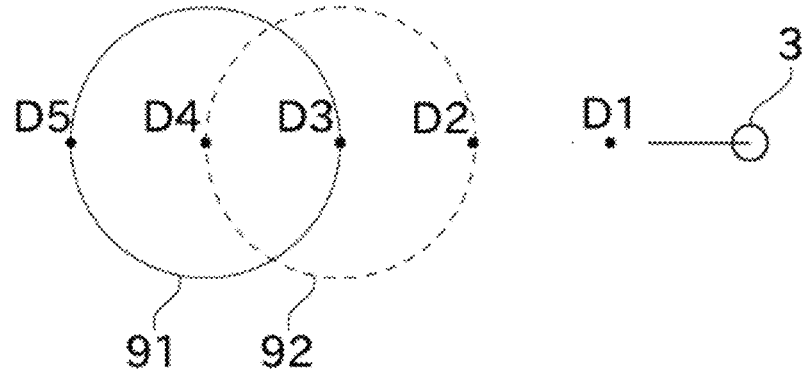
FIG. 4 is a view illustrating one example of indication of a collision risk zone and a watch zone in the situation of FIG. 2.
Figure 4:
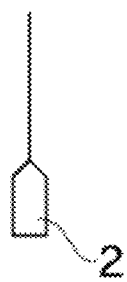
Figure 5:
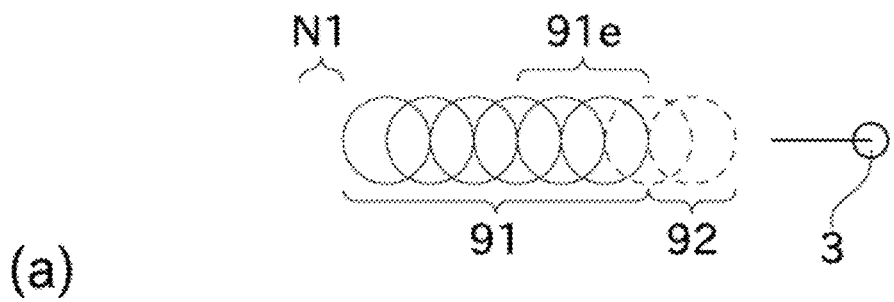
FIG. 5 is a view illustrating the indication of the collision risk zone and the watch zone according to this embodiment, as compared with a conventional indication of OZT.
Figure 5:
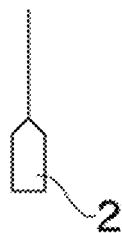
Figure 5:
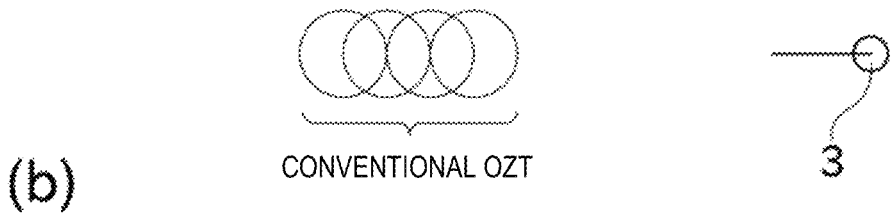
Figure 5:
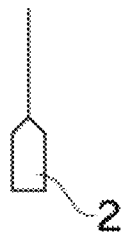

Next, the display data generating module 41 is described. FIG. 4 is a view illustrating one example of the indication of a collision risk zone 91 and a watch zone 92 in the situation of FIG. 2. FIG. 5 is a view illustrating the indication of the collision risk zone 91 and the watch zone 92 according to this embodiment, as compared with the conventional indication of OZT.

The display data generating module 41 may generate display data for displaying information for supporting the ship operator on the display unit 5, and output it to the display unit 5 via a suitable interface.

In FIG. 4, one example of a display screen in the display unit 5 is illustrated. As illustrated in FIG. 4, the display data generating module 41 may generate display data diagrammatically indicating the position and the speed of the ship 2, the position and the speed of the another ship 3, etc. The display data generating module 41 may further display the collision risk zone 91 or the watch zone 92 at each of the determination points D1, D2, . . . according to the determination result of the zone display determining module 34.

FIG. 4 illustrates one example of the indication of the display unit 5 in the situation of FIG. 2, where the risk value RP4 corresponding to the separating distance R4 is 1, the risk value corresponding to the separating distance R3 is 0.3, and the risk values corresponding to other respective separating distances R1, R2, and R5 are 0.

As illustrated in FIG. 4, a symbol indicative of the collision risk zone 91 is displayed at the determination point D4, and a symbol indicative of the watch zone 92 is displayed at the determination point D3. No symbol is displayed at other determination points D1, D2, and D5. Note that, since the determination points D1, D2, . . . are points for being used as references of the calculation, they are illustrated in FIG. 4 for explanation, but they will not actually be displayed on the screen.

The collision risk zone 91 and the watch zone 92 may be displayed as circular symbols centering on the determination point Dn. The size of the circle may be determined suitably so that it does not become excessively small. For example, the size of the circle may be set so that its diameter becomes equal to the ship length L.

For example, when the circular symbols of the collision risk zones 91 are displayed at two adjacent determination points Dn, it is not desirable that a gap is produced between the circles. Therefore, the time interval $\Delta T$ for the other ship future position estimating module 13 calculating the determination point Dn may be defined so that the distance between the adjacent determination points Dn is fully shortened in consideration of the size of the circular symbol and the magnitude of the other ship velocity vector Vt. Therefore, the area (two-dimensional) continuity of the indication of the collision risk zone 91 or the watch zone 92 can be secured.

Since all of the ship position P0, the ship velocity vector V, the other ship position Pr0, and the other ship velocity vector Vt which are inputted into the ship maneuver supporting device 1 vary every moment, the indication of the collision risk zone 91 and the watch zone 92 may need to be updated on real time according to the variation. Further, there may not be just one another ship 3 but may be a plurality of other ships 3 around the ship 2, and in this case, the display processing of the collision risk zone 91 and the watch zone 92 may have to be performed for each of the other ships 3. Therefore, it is important to reduce the calculation load required for the processing.

Although the other ship future position estimating module 13 can theoretically generate an infinite number of determination points Dn, the calculation load will become too heavy if the number of the determination points Dn becomes large. Thus, in this embodiment, a given determination limit distance may be defined so that the positions of the determination points Dn outputted from the other ship future position estimating module 13 are limited within the determination limit distance from the other ship position Pr0. Therefore, the calculation load can be prevented from being too large.

Note that, in this embodiment, the computational complexity which is required for determining whether the collision risk zone 91 and the watch zone 92 are to be displayed at each determination point Dn is reduced compared with the conventional technique, as described above. Therefore, even when the distance between the adjacent determination points Dn is shortened or the determination limit distance is extended to generate the large number of determination points Dn, the processing can be performed satisfactorily on real time. Therefore, the resolution of displaying the collision risk zone 91 and the watch zone 92 can be increased, or the indication of the collision risk zone 91 and the watch zone 92 based on the estimation of more advanced future can be performed.

In the display data generated by the display data generating module 41, the color displayed on the display unit 5 can be differentiated between the collision risk zone 91 and the watch zone 92. In FIG. 4, the differentiation of the display color between the collision risk zone 91 and the watch zone 92 is illustrated by a solid line and a broken line, for the sake of expressing in the drawing. Therefore, since the ship operator can clearly distinguish the area where the possibility of a collision with another ship 3 is high, and the area where the collision will not occur but the possibility of another ship 3 coming into the private length PL is high, he/she can easily understand the situation.

Note that, it is not limited to changing the color for changing the indication on the display unit between the collision risk zone 91 and the watch zone 92. For example, between the collision risk zone 91 and the watch zone 92, the differentiation may be the existence of painting out the inside of the zone, or a variation in the transparency or the pattern of the painting-out zones. As illustrated in FIG. 4, the contours of the symbols of the zones may be differentiated by a solid line, a broken line, etc. Further, it may be configured so that the ship operator can distinguish between the collision risk zone 91 and the watch zone 92 by adding character(s), a sign, or a small mark to the zone symbol.

The watch zone 92 may correspond to the case where the risk value RP is larger than 0 and smaller than 1, and the display data generating module 41 may generate, for the watch zone 92, the display data which differentiates the indication mode according to the risk value RP. For example, as the risk value RP becomes smaller, the transparency of the contour of the displayed watch zone 92 or the painting out of the inside may be increased gradually. Alternatively, the collision risk zone 91 may be displayed in red, and the watch zone 92 may be changed in the display color so that the red is changed gradually to yellow as the risk value RP becomes smaller.

Instead of displaying uniformly when the risk value RP is larger than 0 and smaller than 1, the indication of the watch zone may only be performed when the risk value RP is larger than a given threshold set by the ship operator. Therefore, the indication according to the preference of the ship operator can be realized.

Note that the collision risk zone 91 and the watch zone 92 may be displayed in the completely same mode.

As described above, in this embodiment, the evaluation of the collision risk in consideration of the ship length L may be performed using the risk function FR. That is, it may not treat the ship 2 as a point but as an elongated straight line in the front-and-rear direction with the ship length L. Therefore, for example, even when the ship length L corresponds to a fairly long large-sized ship, the high-risk area of the collision can be displayed at an appropriate position in consideration of the actual size of the ship.

FIG. 5 illustrates, under the same situation, a comparison of the indication between the collision risk zones 91 of this embodiment and the conventional OZT. As illustrated in FIG. 5($a$), the collision risk zone 91 of this embodiment may extend to the side closer to the another ship 3 (an extended part 91$e$), more than the conventional OZT illustrated in FIG. 5($b$), as a result of taking the ship length L into consideration. This indication illustrates that, when taking the actual ship length L into consideration, the ship 2 should not be navigated to the part which overlaps with the conventional OZT and to the extended part 91$e$ which spreads therefrom, in order to avoid the collision with the another ship 3.

In the indication example of this embodiment illustrated in FIG. 5($a$), the watch zone 92 accompanying having set the private length PL forward of the ship 2 is displayed on the side closer to the another ship 3 than the collision risk zone 91. This indication illustrates that, if the ship is navigated to the watch zone 92, the possibility that the another ship 3 will enter into the area corresponding to the private length PL forward of the ship 2 is high.

Note that, in the indication example of this embodiment illustrated in FIG. 5($a$), the collision risk zone 91 is not displayed at a location N1 corresponding to the circle at the left end of the conventional OZT illustrated in FIG. 5($b$). This is a result of that, in this embodiment, the length L2 of the part on the stern side from the ship reference position among the ship length L is considerably short, and the risk calculating module 33 appropriately took this into consideration. Although the example of FIG. 5($a$) illustrates a case where the private length PL is not set rearward of the ship 2, if the rearward private length PL is set suitably, the watch zone 92 will be displayed at the location N1 described above.

In the above description, the collision risk may be evaluated while considering that the position of the radar antenna provided to the radar device is the same as the position of the GNSS antenna of the GNSS positioning device (in other words, the ship reference position). However, when the distance between the attaching position of the radar antenna and the attaching position of the GNSS antenna cannot be ignored, it may be desirable to recalculate the other ship position acquired by the other ship data acquiring module 12 so that the position of the GNSS antenna becomes a reference, thereby enabling a more accurate collision calculation. On the other hand, the ship reference position may be determined so that it is in agreement with the position of the radar antenna, not the position of the GNSS antenna. In this case, the ship position etc. acquired by the other ship data processing module 11 may be recalculated so that the position of the radar antenna becomes a reference.

As described above, the ship maneuver supporting device 1 of this embodiment may include the other ship data acquiring module 12, the other ship future position estimating module 13, the ship data acquiring module 22, the ship future position estimating module 23, the risk calculating module 33, and the display data generating module 41. The other ship data acquiring module 12 may acquire the information on the position and the velocity of another ship 3 (the other ship position Pr0 and the other ship velocity vector Vt). The other ship future position estimating module 13 may estimate the other ship positions Pr1, Pr2, . . . at the plurality of future time points T1, T2, . . . when the another ship 3 continues traveling on the same course and at the same traveling speed, based on the other ship position Pr0 and the other ship velocity vector Vt which are acquired by the other ship data acquiring module 12. The ship data acquiring module 22 may acquire the information on the position and the velocity of the ship 2 (the ship position P0 and the ship velocity vector V). The ship future position estimating module 23 may estimate the ship positions P1, P2, . . . corresponding to the other ship positions Pr1, Pr2, . . . estimated by the other ship future position estimating module 13, when the ship 2 continues traveling on the course which is arbitrarily defined at the ship position P0 and at the same traveling speed, based on the ship position P0 and the ship velocity vector V which are acquired by the ship data acquiring module 22. The risk calculating module 33 may calculate the risk value RP for determining whether the collision risk zone 91 which is the zone where the possibility of the collision between the ship 2 and the another ship 3 will occur in the future is high is to be displayed based on the separating distances R1, R2, . . . between the other ship positions Pr1, Pr2, . . . estimated at the respective time points T1, T2, . . . , and the ship positions P1, P2, . . . estimated corresponding thereto. The display data generating module 41 may generate the display data for displaying the collision risk zones 91 at the estimated other ship positions Pr1, Pr2, . . . based on the determination using the risk value RP.

Therefore, the collision risk zone 91 which is the zone where the collision between the ship 2 and the another ship 3 will occur in the future can be displayed on the display unit 5, utilizing the size of the ship 2, and the separating distances R1, R2, . . . between the ship 2 and the another ship 3. That is, since the size of the ship 2 is taken into consideration, the collision risk zone 91 which matches with the actual navigation feel of the ship operator can be displayed with higher adequacy. Further, instead of the conventional calculation of the simultaneous existence probability of the ship and the another ship in consideration of the generation of the speed error, the indication determination of the collision risk zone 91 may be performed based on the separating distances R1, R2, . . . between the ship 2 and the another ship 3, and thus, the calculation load can be remarkably reduced.

Figure 6:
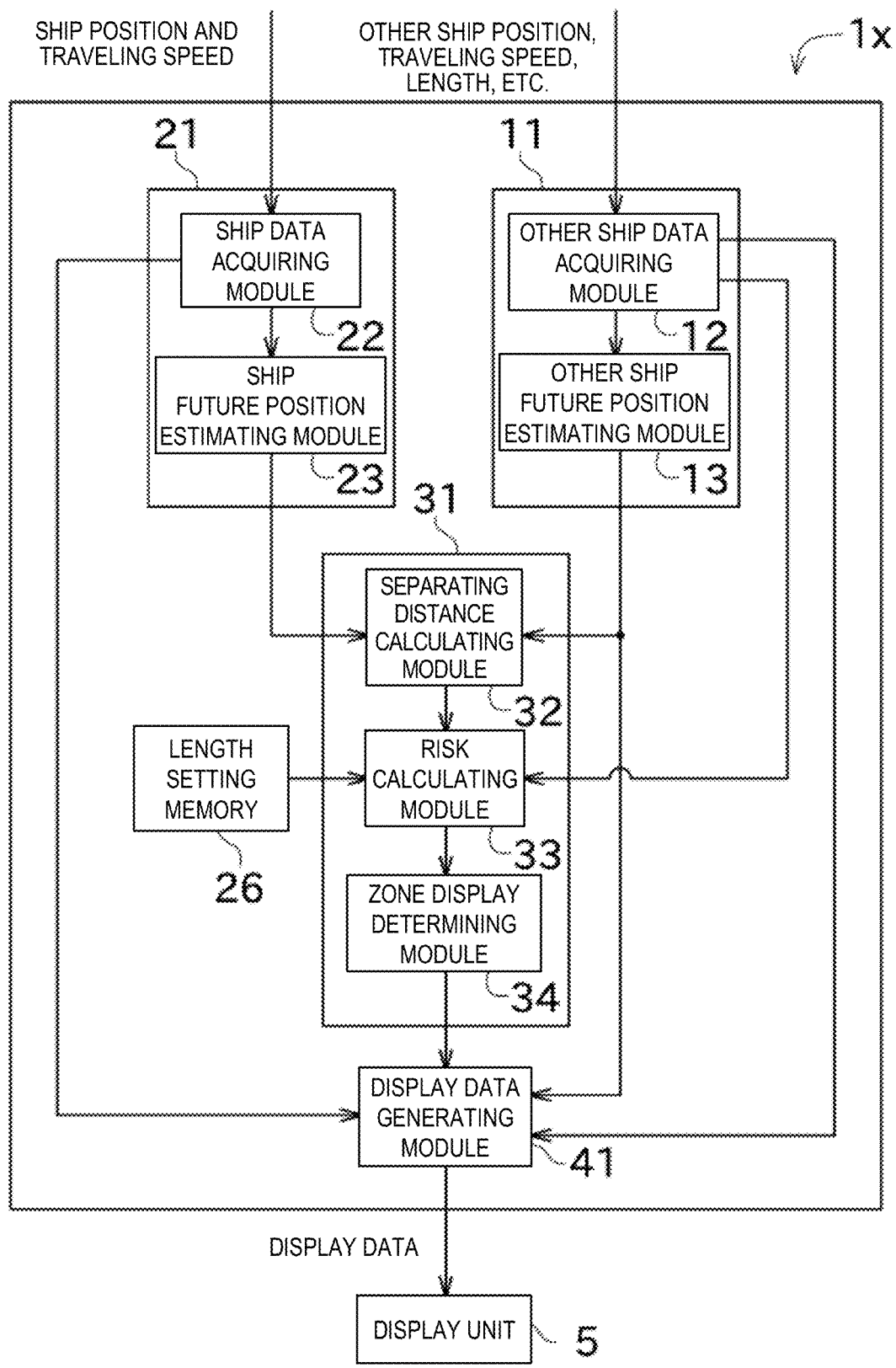
FIG. 6 is a block diagram illustrating an electric configuration of a ship maneuver supporting device of a second embodiment.

Next, a second embodiment is described. FIG. 6 is a block diagram illustrating an electric configuration of a ship maneuver supporting device 1× of the second embodiment. Note that, in the description of the second embodiment, the same reference characters are given in the drawing to members identical or similar to the first embodiment to omit the explanation thereof.

According to the ship maneuver supporting device 1× of the second embodiment illustrated in FIG. 6, the other ship data acquiring module 12 may acquire the information on the position and the velocity of the another ship 3 from an AIS device, not from the radar device. The AIS device is an automatic ship identification system for exchanging navigational information between a plurality of ships, which is capable of acquiring data, such as the position, a ground speed, the name, the length, and the width of the another ship 3, and the position of the positioning antenna.

The other ship data acquiring module 12 may acquire not only the position and the velocity of the another ship 3, but also the information on the length of the another ship 3 and the position of the positioning antenna in the front-and-rear direction. The other ship data acquiring module 12 may output to the risk calculating module 33 the length of the another ship 3 from the position of the positioning antenna to the bow, and the length from the position of the positioning antenna to the stern, based on the information on the length and the position of the positioning antenna of the another ship 3.

The risk calculating module 33 may calculate the risk value RP utilizing the ship length L and the private length PL which are acquired from the length setting memory 26, and the length of the another ship acquired from the other ship data acquiring module 12. As the risk function FR used in this embodiment, the area of the separating distance R where the risk value RP becomes 1 in the graph of FIG. 3(b), which is changed so that it is suitably extended in the front-and-rear direction of the ship 2 taking the length of the another ship 3 into consideration, may be used.

According to this embodiment, not only regarding the ship 2 but also regarding another ship 3, it may be treated as an elongated straight line having the length of the another ship 3 in the front-and-rear direction, instead of being treated as a point, and the possibility of a collision is evaluated. Therefore, the indication of the collision risk zone 91 and the watch zone 92 can further match with the actual navigation feel of the ship operator.

The information on the another ship 3 obtained by the AIS may not include the information on the size of the another ship 3. In this case, the risk calculating module 33 can calculate the risk value RP, while uniformly considering that the length of the another ship 3 is equal to the length which is suitably set in advance by the ship operator.

Although the suitable embodiments of the present disclosure are described above, the above configurations may be changed as follows, for example.

The other ship positions Pr1, Pr2, . . . (determination points D1, D2, . . . ) which are defined by the other ship future position estimating module 13 on the course C of the other ship position Pr0 are not limited to being lined up at the equal interval like in FIG. 2, but may also be lined up at unequal intervals. For example, considering a plurality of virtual straight lines which radially spread at an equal angular interval from the position of the ship 2, the other ship positions Pr1, Pr2, . . . may be defined at positions where the virtual straight lines intersect with the course C described above. In this case, the plurality of virtual straight lines can be disposed so that the angular intervals of the virtual straight lines near the current course of the ship 2 (for example, the virtual straight lines within 10° of the left and right of the course of the ship 2) become smaller than the angular intervals of the virtual straight lines outside the angular range. In this case, since the determination points D1, D2, . . . can be densely defined in the area where an interfere easily occurs on the present course of the ship 2, the spatial resolution for displaying the collision risk zone and the watch zone near the scheduled course of the ship 2 can be improved.

As described above, the other ship positions Pr1, Pr2, . . . may correspond to the plurality of future time points T1, T2, . . . . Therefore, depending on how the other ship positions Pr1, Pr2, . . . are defined, the sizes of the corresponding ship position candidate circles E1, E2, . . . will also be changed.

The ship reference position is not limited to the position described in the above embodiments, but it may be defined at an arbitrary point of the ship 2. For example, the ship reference position may be defined at a position used as a turning axis of the ship 2 (a pivoting position of the ship body movement).

In actual navigation, one should pay attention to other ships 3 which are located forward farther away during a high-speed travel, as compared with the case of a low-speed travel. In consideration of this, the private length PL set especially forward of the ship 2 may be changed automatically according to the magnitude of the ship velocity vector V.

According to the second embodiment, in the radar device described in the first embodiment, the other ship data processing module 11 may acquire the length of the another ship 3 which is acquired from the shape of the echo image tracked by the TT function, not by the AIS.

The indication of the collision risk zone 91 may be determined not only in consideration of the length of the ship 2, but also in consideration of the width. The indication of the watch zone 92 may be determined not only in consideration of the length of the private area, but also in consideration of the width. Similarly, not only the length of the another ship 3 but also the width may be taken into the consideration.

The risk value (collision risk value) for determining whether the collision risk zone 91 is to be displayed, and the risk value (watch risk value) for determining whether the watch zone 92 is to be displayed may be calculated by using separate functions, instead of the common risk function FR.

The collision risk zone 91 and the watch zone 92 may be displayed in respective arbitrary modes. For example, instead of the circles centering on the determination points Dn, they may be expressed by a line which connects the determination points Dn. The thickness of the line may be set suitably.

In the risk function FR, the risk value RP of the private length PL may be decreased, for example, in a curved relation, instead of being decreased linearly as illustrated in FIG. 3(b).

According to the calculation processing module 31 in the first embodiment, the risk calculating module 33 may calculate the risk value RP in consideration of the physical size of the ship 2. Alternatively, the physical size of the ship 2 may be taken into the consideration in the stage where the separating distance calculating module 32 calculates the separating distance Rn. For example, the separating distance calculating module 32 may consider the length L1 from the ship reference position to the bow, and perform the calculation using the minimum value of the distance between the estimated position of the representative point of the another ship 3 and the estimated future tip-end position of the bow of the ship 2, as the separating distance Rn.

The ship maneuver supporting device 1 may be provided integrally with the display unit 5.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Ship Maneuver Supporting Device
11 Other Ship Data Processing Module
32 Separating Distance Calculating Module
33 Risk Calculating Module
41 Display Data Generating Module

The invention claimed is:

1. A ship maneuver supporting device, comprising;
a display; and
processing circuitry configured to:
acquire second ship information on a position and a velocity of a second ship,
based on the second ship information and on an assumption that the second ship will travel at a constant course and speed, estimate positions of the second ship at a plurality of future time points,
acquire first ship information on a position and a velocity of a first ship,
based on the first ship information and based on the first ship traveling on a course arbitrarily defined from the position of the first ship at a constant first ship traveling speed, estimate positions of the first ship at the plurality of future time points,
determine a collision risk value for determining whether or not to display a collision risk zone, the collision risk zone being a zone where a collision between the first ship and the second ship may occur in the future,
wherein the collision risk value is determined at each of the plurality of future time points based on a separating distance between the estimated positions between the first ship and the second ship at each of the plurality of future time points,
generate collision risk zone display data for displaying the collision risk zone, based on determining that the collision risk value at the one of the plurality of future time points is above a predetermined collision risk threshold, and
based on the collision risk zone display data, display the collision risk zone along the arbitrary course of the first ship on the display,
wherein the processing circuitry is further configured to:
set a watch area relative to a direction of the first ship,
based on a size of the watch area and the separating distance between the estimated positions between the first ship and the second ship at each of the plurality of future time points, determine a watch risk value for determining whether or not to display a watch zone adjacent and prior to the collision risk zone along the arbitrary course of the first ship,
upon determining that the watch risk value is above a predetermined watch risk threshold at one of the plurality of future time points, generate watch zone display data for displaying the watch zone relative to the collision risk zone, and
based on the watch zone display data, display the watch zone adjacent and prior to the collision risk zone along the arbitrary course of the first ship in a manner that is distinguishable from the collision risk zone.

2. The ship maneuver supporting device of claim 1, wherein the watch area relative to the direction of the first ship is one of an area ahead of or behind the first ship.

3. The ship maneuver supporting device of claim 1, wherein the collision risk value is further based on a physical size of at least one of the first ship or the second ship.

4. The ship maneuver supporting device of claim 1, wherein the collision risk zone and the watch zone are displayed in different colors.

5. The ship maneuver supporting device of claim 1, wherein the collision risk value is determined only for a future time point of the plurality of future time points when the separating distance is below a predefined limit.

6. The ship maneuver supporting device of claim 1, wherein the size of the watch area varies according to a traveling speed of the first ship.

7. The ship maneuver supporting device of claim 1, wherein the watch zone is displayed prior to the collision risk zone along the arbitrary course of the first ship.

8. The ship maneuver supporting device of claim 7, wherein the watch zone and the collision risk zone are circles of equal radius.

9. A ship maneuver supporting method performed by a device, the ship maneuver supporting method comprising;
- acquiring second ship information on a position and a velocity of a second ship,
- based on the second ship information and on an assumption that the second ship will travel at a constant course and speed, estimating positions of the second ship at a plurality of future time points,
- acquiring first ship information on a position and a velocity of a first ship,
- based on the first ship information and based on the first ship traveling on a course arbitrarily defined from the position of the first ship at a constant first ship traveling speed, estimating positions of the first ship at the plurality of future time points,
- determining a collision risk value for determining whether or not to display a collision risk zone, the collision risk zone being a zone where a collision between the first ship and the second ship may occur in the future,
- wherein the collision risk value is determined at each of the plurality of future time points based on a separating distance between the estimated positions between the first ship and the second ship at each of the plurality of future time points,
- generating collision risk zone display data for displaying the collision risk zone, based on determining that the collision risk value at the one of the plurality of future time points is above a predetermined collision risk threshold, and
- based on the collision risk zone display data, displaying the collision risk zone along the arbitrary course of the first ship on a display,
- wherein the ship maneuver supporting method further comprises:
- setting a watch area relative to a direction of the first ship,
- based on a size of the watch area and the separating distance between the estimated positions between the first ship and the second ship at each of the plurality of future time points, determining a watch risk value for determining whether or not to display a watch zone relative to the collision risk zone,
- upon determining that the watch risk value is above a predetermined watch risk threshold at one of the plurality of future time points, generating watch zone display data for displaying the watch zone adjacent and prior to the collision risk zone along the arbitrary course of the first ship, and
- based on the watch zone display data, displaying the watch zone adjacent and prior to the collision risk zone along the arbitrary course of the first ship in a manner that is distinguishable from the collision risk zone.

10. The ship maneuver supporting method of claim 9, wherein the collision risk value is determined only for a future time point of the plurality of future time points when the separating distance is below a predefined limit.

11. The ship maneuver supporting method of claim 9, wherein the watch zone is displayed prior to the collision risk zone along the arbitrary course of the first ship.

12. The ship maneuver supporting method of claim 11, wherein the watch zone and the collision risk zone are circles of equal radius.

* * * * *